Patented May 11, 1937

2,079,758

UNITED STATES PATENT OFFICE 2,079,758

UNSATURATED ETHERS AND PROCESS FOR PRODUCING SAME

Gerard Jean Berchet, Wilmington, Del., assignor to E. I. du Pont de Nemours & Company, Wilmington, Del., a corporation of Delaware No Drawing. Application May 28, 1936,
Serial No. 82,261

20 Claims. (Cl. 260—150)

This invention relates to organic ethers and to a process for producing the same. More particularly, it relates to unsaturated ethers containing a halogen atom and a residue of an organic hydroxyl compound.

It is an object of this invention to prepare new ethers of the general formula:

$$CH_3—CX=CH—CH_2OR$$

where X is a halogen atom and —OR is a residue of an organic hydroxyl compound. A more specific object is to prepare ethers of the general formula:

$$CH_3—CCl=CH—CH_2OR$$

where —OR is a residue of an organic hydroxyl compound. A further object is to react dihalogen-2,4-butenes-2 with organic hydroxyl compounds. Other objects will appear hereinafter.

These objects are accomplished by reacting a compound of the general formula:

$$CH_3—CX=CH—CH_2X'$$

in which X and X' are halogen atoms with an organic hydroxyl compound in the presence of an alkali metal hydroxide. The ether formed may be recovered from the reaction mass and purified. A preferred modification of the invention involves reacting dichloro-2,4-butene-2 with a metal alcoholate or phenolate or with an alcohol or a phenol in the presence of an alkali metal hydroxide to form compounds of the general formula:

$$CH_3—CCl=CH—CH_2OR$$

where —OR is a residue of an organic hydroxyl compound.

The following examples are included only for the purpose of illustrating the invention and, therefore, it is to be understood that they are not to be construed as limiting the scope of the invention.

Example I

One mole (56 g.) of potassium hydroxide was dissolved in 250 cc. of methanol to which was added one mole (125 g.) of dichloro-2,4-butene-2. The reaction mixture became warm with separation of potassium chloride and refluxing was continued during one-half hour. The potassium chloride (68 g.) was removed by filtration and the filtrate was washed with a concentrated solution of calcium chloride, thereby separating the product. After drying and fractionating there was obtained 88 g. of an ether having the formula:

$$CH_3—CCl=CH—CH_2OCH_3$$

a yield of 73 per cent.

Example II

Into a cold ethanol solution (400 cc.) containing 1 mole of sodium ethoxide was slowly added with agitation 125 g. (1 mole) of dichloro-2,4-butene-2. The reaction mixture was allowed to stand for three hours and was finally gently refluxed for a short time, after which it was decomposed with water, the water insoluble portion separated, dried and fractionated. There was obtained 92 g. of the ether:

$$CH_3—CCl=CH—CH_2OC_2H_5$$

a yield of 68 per cent.

Example III

Into a cold solution of methanol (200 cc.) containing one-half mole of sodium methoxide was added 47 g. (one-half mole) of phenol in 50 cc. of methanol. To this was added with agitation 63 g. (one-half mole) of dichloro-2,4-butene-2 and the reaction mixture was gently refluxed during three hours. After dilution with water, the insoluble layer was washed twice with 10 per cent alkali and then dried. By fractionation there was obtained 66 g. of an ether of the formula:

$$CH_3—CCl=CH—CH_2OC_6H_5$$

a yield of 55 per cent.

The table given below summarizes some of the physical properties of the compounds prepared as described in the above examples.

Table

| Compound | B. P./mm. | $d_4^{20}$ | $N_D^{20}$ | Calculated | | Found | |
|---|---|---|---|---|---|---|---|
| | | | | Percent C | Percent H | Percent C | Percent H |
| CH₃CCl=CH—CH₂OCH₃ | 125–6°/760 | | | 49.79 | 7.46 | 49.87 | 7.74 |
| CH₃CCl=CH—CH₂OC₂H₅ | 88–9°/129 | 0.9788 | 1.4392 | 53.50 | 8.18 | 53.54 | 8.39 |
| CH₃CCl=CH—CH₂OC₆H₅ | 94°/1 | 1.1080 | 1.5376 | 65.75 | 6.03 | 66.12 | 5.97 |

The invention is illustrated in the above examples by applying it to dichloro-2,4-butene-2 but has been stated above any dihalogen-2,4-butenes-2 may be employed. The halogen atoms may be chlorine, bromine, or iodine and while preferably the same, they may be different.

Specific dihalogen butenes which may be employed in the present invention are dichloro-2,4-butene-2, dibromo-2,4-butene-2, diiodo-2,4-butene-2, chloro-2-bromo-4-butene-2, and bromo-2-chloro-4-butene-2. These dihalogen butenes may be prepared as described in copending application of Carothers & Collins, Ser. No. 688,030, filed Sept. 2, 1933.

The dihalogen butene may be reacted with the alcohol or phenol in the presence of an alkali metal hydroxide, or it may be reacted with an alkali metal alcoholate or phenolate. In either case the mobile chlorine atom, which is the one attached to the end carbon atom, is displaced with separation of alkali metal halide and formation of an ether of the formula:

$$CH_3—CX=CH—CH_2OR$$

X being halogen and OR being the residue of the alcohol or phenol.

The phenols employed herein may be monohydric or polyhydric, preferably the former. The alcohol may be primary, secondary or tertiary; aromatic, alicyclic, or aliphatic; saturated or unsaturated; preferably it is primary, saturated and composed of carbon, hydrogen and oxygen only. Specific hydroxyl compounds suitable for use in this invention are: propyl, isopropyl, n-butyl, sec.-butyl, crotyl, isobutyl, n-octyl, n-decyl, n-dodecyl, cetyl, benzyl, b-phenylethyl and cinnamyl alcohols, glycol and glycerol; and cresols, xylols, resorcinol, and p,p'-dihydroxydiphenyl.

The preferred alkali metal hydroxides are sodium and potassium hydroxides. Similarly, sodium and potassium alcoholates and phenolates are preferred. Other alkali metal compounds may be used, however, such as those of lithium and caesium.

The reaction time and temperature may be varied within rather wide limits. In the above examples the reaction was initiated without the application of heat but was finally brought to completion by refluxing for a period ranging from one-half hour to three hours. Different alcohols and phenols may require different times and temperatures of reaction, but such changes when needed will be apparent to those skilled in the art.

The various reactants may be brought together in any desired manner. Both slow and rapid addition of the dihalogen butene is described in the examples and in general, it may be said that it may be added either at once or dropwise, with or without stirring. Superatmospheric pressures may be employed if desired. Generally the ingredients are employed in chemically equivalent proportions though it is sometimes advantageous to use an excess of a difficultly reacting hydroxyl compound.

The ether formed by the process of this invention may be removed from the reaction mixture in various ways for example, by dilution with water and washing with calcium chloride or by fractional distillation.

It will be apparent that a wide variety of new ethers are made available by this invention. The starting material, the dihalogen-2,4-butene-2, particularly dichloro-2,4-butene-2, is a readily available derivative of vinyl-acetylene. Moreover, the process leading to the new ethers is extremely simple and convenient, whereas it would be exceedingly difficult to arrive at these ethers by any other method. The ethers produced are, therefore, not only novel but the method of their production is highly advantageous. The new ethers, besides their usefulness in organic synthesis, may be used as solvents, plasticizers, perfume material, high pressure lubricants, etc.

It is apparent that many widely different embodiments of this invention may be made without departing from the spirit and scope thereof, and, therefore, it is not intended to be limited except as indicated in the appended claims.

I claim:

1. A compound of the general formula:

$$CH_3—CX=CH—CH_2OR$$

in which R is a radical obtainable by removing a hydroxyl group from a compound of the group consisting of alcohols and phenols and X is a halogen atom.

2. A compound of the general formula:

$$CH_3—CCl=CH—CH_2OR$$

in which R is a radical obtainable by removing a hydroxyl group from a compound of the group consisting of alcohols and phenols.

3. A compound of the general formula:

$$CH_3—CCl=CH—CH_2OR'$$

in which R' is a monovalent hydrocarbon radical.

4. A chloro-2-alkoxy-4-butene-2.

5. A chloro-2-aryloxy-4-butene-2.

6. The process which comprises reacting ingredients comprising a dihalogen-2,4-butene-2 and an organic hydroxyl compound of the group consisting of alcohols and phenols.

7. The process which comprises reacting ingredients comprising dichloro-2,4-butene-2 and an organic hydroxyl compound of the group consisting of alcohols and phenols.

8. The process which comprises reacting a dihalogen-2,4-butene-2 with a compound from the class consisting of alkali metal alcoholates and alkali metal phenolates.

9. The process which comprises reacting a dihalogen-2,4-butene-2, in the presence of an alkali metal hydroxide, with a compound from the class consisting of alkali metal alcoholates and alkali metal phenolates.

10. The process which comprises adding an alkali metal hydroxide to an organic hydroxyl compound of the group consisting of alcohols and phenols and then reacting the resulting composition with a dihalogen-2,4-butene-2.

11. The process which comprises reacting dichloro-2,4-butene-2 with an alkali metal alcoholate.

12. The process which comprises reacting dichloro-2,4-butene-2 with an alkali metal phenolate.

13. In a process for the production of ethers of halogen-2-hydroxy-4-butenes-2, the steps which comprise reacting ingredients comprising a dihalogen-2,4-butene-2 and an organic hydroxyl compound of the group consisting of alcohols and phenols and then separating an ether from the reaction mass.

14. In a process for the production of ethers of chloro-2-hydroxy-4-butene-2, the steps which comprise reacting ingredients comprising dichloro-2,4-butene-2 and an organic hydroxyl compound of the group consisting of alcohols and phenols and then separating an ether from the reaction mass.

15. Chloro-2-methoxy-4-butene-2.
16. Chloro-2-ethoxy-4-butene-2.
17. Chloro-2-phenoxy-4-butene-2.
18. In a process for the production of ethers of chloro-2-hydroxy-4-butene-2, the steps which comprise reacting ingredients comprising dichloro-2,4-butene-2, a primary saturated alcohol composed of carbon, hydrogen and oxygen only, and a hydroxide of the group consisting of sodium hydroxide and potassium hydroxide, and then separating an ether from the reaction mass.
19. In a process for the production of ethers of chloro-2-hydroxy-4-butene-2, the steps which comprise reacting ingredients comprising dichloro-2,4-butene-2, a monohydric phenol, and a hydroxide of the group consisting of sodium hydroxide and potassium hydroxide and then separating an ether from the reaction mass.
20. In a process for the production of ethers of chloro-2-hydroxy-4-butene-2, the steps which comprise mixing ingredients comprising dichloro-2,4-butene-2, methanol, and potassium hydroxide, warming the mixture and thereafter separating chloro-2-methoxy-4-butene-2 from the resulting mass.

GERARD JEAN BERCHET.